United States Patent

Espy et al.

[11] 4,042,122
[45] Aug. 16, 1977

[54] REORIENTATION DEVICE FOR AN OBJECT MANIPULATOR

[75] Inventors: Donald M. Espy; James L. Henry, both of Dayton, Ohio

[73] Assignee: The Bendix Corporation, Southfield, Mich.

[21] Appl. No.: 581,326

[22] Filed: May 27, 1975

[51] Int. Cl.² .................................................. B65G 47/90
[52] U.S. Cl. ............................. 214/1 CM; 214/1 BB; 214/1 BD; 214/1 QD
[58] Field of Search .................. 214/1 R, 1 Q, 1 CM, 214/1 QD, 1 B, 1 BB, 1 BC, 1 BD, 147 G, 314, 620, 652, 650 R, 658

[56] References Cited

U.S. PATENT DOCUMENTS

| 1,437,547 | 12/1922 | Pope | 214/147 G |
| 2,390,293 | 12/1945 | Colson | 214/1 QD |
| 2,678,025 | 5/1954 | Straky | 214/1 QD X |
| 2,747,263 | 5/1956 | Green | 214/1 QD X |
| 3,137,402 | 6/1964 | Gunn, Jr. | 214/314 |
| 3,888,362 | 6/1975 | Fletcher et al. | 214/1 CM X |

FOREIGN PATENT DOCUMENTS

822,062  11/1951  Germany .......................... 214/1 QD

*Primary Examiner*—Frank E. Werner
*Attorney, Agent, or Firm*—Raymond J. Eifler; Kenneth A. Seaman; John R. Benefiel

[57] ABSTRACT

A reorientation device for use with a general purpose object manipulator is disclosed, comprised of an arrangement for rotating the object while in the grasp of the manipulator through predetermined detented angles, this reorientation thereby reducing the range of manipulation motions required to be executed by the manipulator device. The specific reorientation arrangement includes pneumatically operated rack and pinion devices adapted to rotate turnover plates through a 180° angle, each of the turnover plates being adapted to carry a respective one of a set of manipulator fingers. By means of a pneumatically operated interposer pin, the rotation of each turnover plate can be selectively arrested at a predetermined angle of rotation short of the full degree of rotation produced by the rack and pinion devices.

4 Claims, 10 Drawing Figures

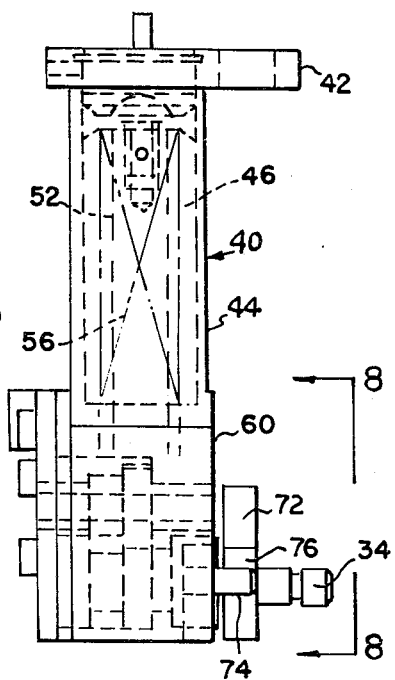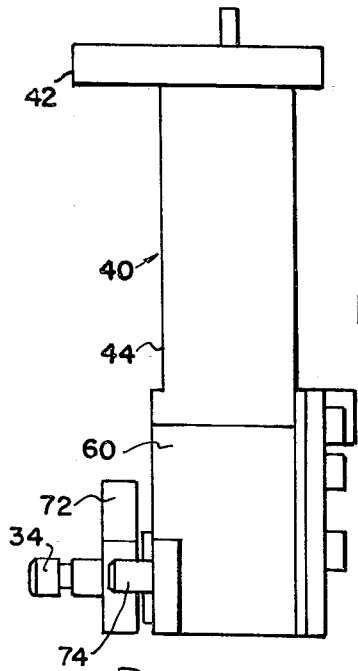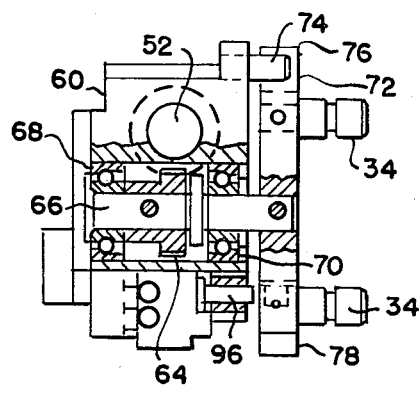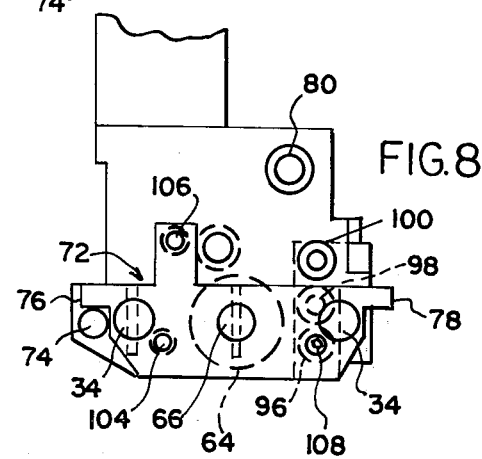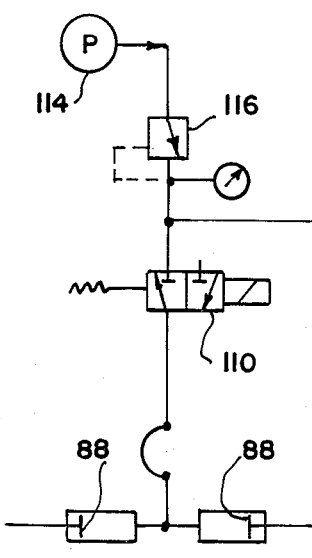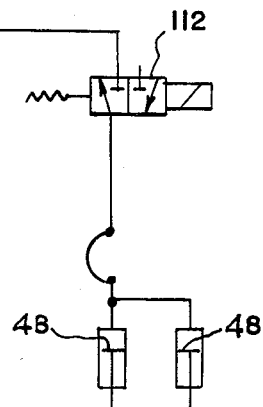

REORIENTATION DEVICE FOR AN OBJECT MANIPULATOR

BACKGROUND OF THE INVENTION

1. Field of the Invention

This invention concerns manipulator devices and more particularly general purpose manipulator devices of the type adapted to grasp and transfer objects from a randomly oriented position at a pick-up location.

2. Description of the Prior Art

General purpose manipulator devices of the type having a capability to grasp objects randomly positioned at a first location and deposit the same at a second location in a preselected orientation have increasing numbers of application in manufacturing processes such as assembly operations, as these processes themselves become more and more automated.

One problem creating limitations on the performance of these devices as well as adding to the complexity of their design, has been created by the number of possible orientations of the objects to be handled in being randomly disposed at the first location. Since many tasks would require grasping of the object in a particular orientation, certain initial orientations of the object might require double handling to reposition the objects in an orientation which the manipulator could accommodate, or else cumbersome approach movements might be required both of which requirements would necessarily lengthen the cycle time, which cycle time could be of critical significance.

In addition, the design of the manipulator and its controls would necessarily be rendered more complex and its size and power requirements greater in so accommodating every possible orientation.

Accordingly, it is an object of the present invention to provide an arrangement for such a manipulator which provides a capability for handling objects in a number of orientations without unduly increasing the size and complexity of the manipulator or creating relatively long cycle times.

SUMMARY OF THE INVENTION

This and other objects of the invention are accomplished by an arrangement for rotating the object while in the grasp of the manipulator through predetermined detented angles, this reorientation thereby reducing the range of manipulation motions required to be executed by the manipulator device. The specific reorientation arrangement includes pneumatically operated rack and pinion devices adapted to rotate turnover plates through a 180° angle, each of the turnover plates being adapted to carry a respective one of a set of manipulator fingers. By means of a pneumatically operated interposer pin, the rotation of each turnover plate can be selectively arrested at a predetermined angle of rotation short of the full degree of rotation produced by the rack and pinion devices.

DESCRIPTION OF THE DRAWINGS

FIG. 3 is a front elevational view of one of the reorientation devices shown in FIG. 2.

FIG. 4 is a front elevational view of the other of the reorientation devices shown in FIG. 2.

FIG. 8 is a view taken in the direction of arrows 8—8 in FIG. 3.

FIG. 9 is a bottom view of the reorientation device shown in FIG. 3.

FIG. 10 is a schematic diagram of the pneumatic circuitry associated with the gripper mechanism and reorientation device shown in FIG. 2.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
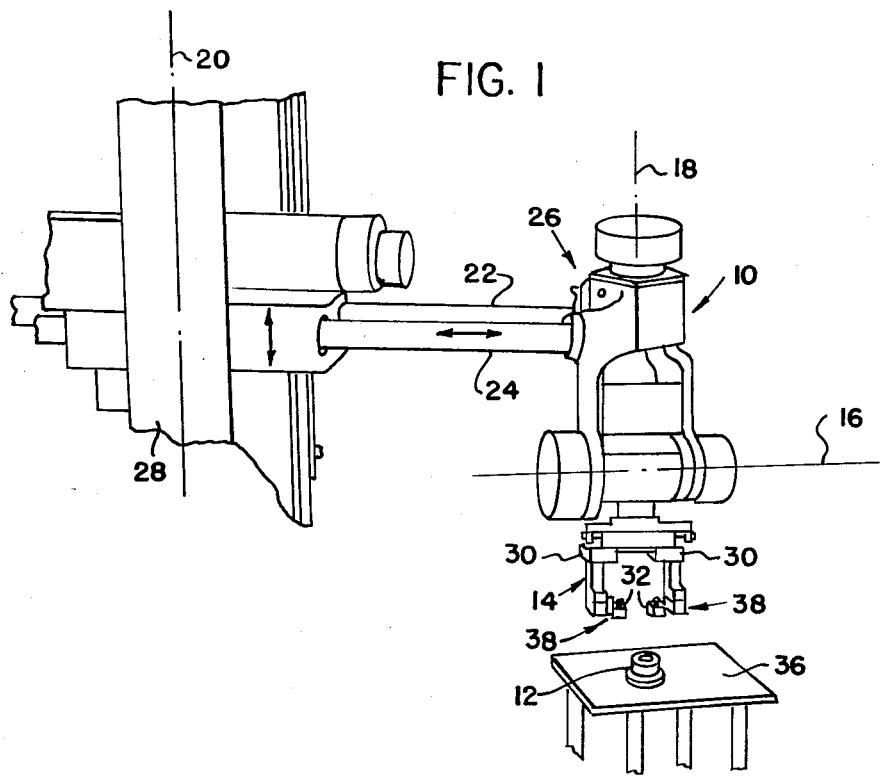
FIG. 1 is a perspective view of a portion of a manipulator device incorporating a reorientation device according to the present invention.
Figure 2:
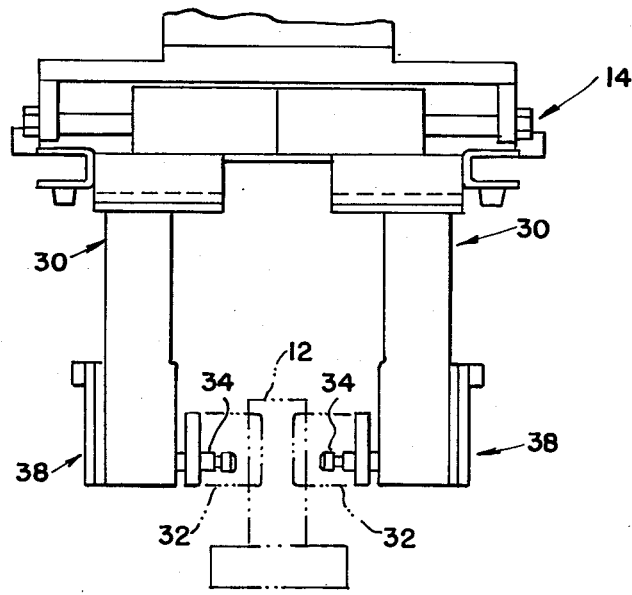
FIG. 2 is a front elevational view of the gripper mechanism of the manipulator device shown in FIG. 1 which incorporates the reorientation device according to the present invention.
Figure 6:
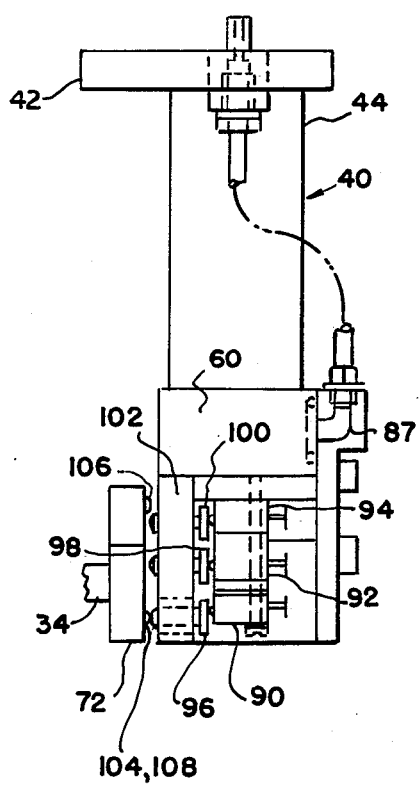
FIG. 6 is a rear elevational view of the reorientation device shown in FIG. 3.
Figure 5:
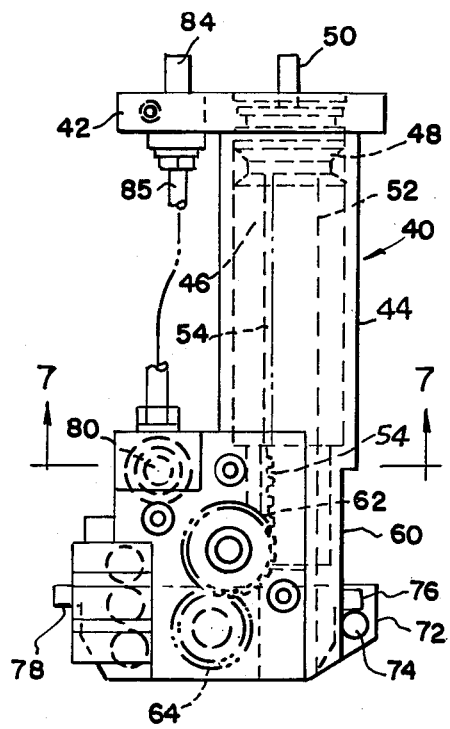
FIG. 5 is a side elevational view of the reorientation device shown in FIG. 3.

Referring to FIGS. 1 and 2, a portion of a manipulator device 10 of the type described is shown. Such devices possess a multi-degree of freedom capability for transferring and positioning in space an object 12 which is gripped in the gripper portion 14 of the manipulator device 10. For example, such a capability is provided in the device shown by rotation about axes 16, 18, 20 and lateral movement provided by in-and-out movement of the support rods 22, 24 as shown, while the entire arm assembly 26 is supported for up-and-down movement of the frame 28.

Positioning in each of these modes of movement is controlled by the system controller and various precision power devices and usually with some sort of position feedback arrangement.

The gripper mechanism 14 is adapted to grip the object 12 as by movement of gripper arms 30 towards each other until pick-up fingers 32 carried by the arms 30 engage the object. Pick-up fingers 32 would commonly be readily detachable from pins 34 so that various configurations of fingers suited to various tasks and/or objects could be used.

Many applications require that the object 12 be picked up in a certain orientation with respect to the gripper mechanism 14 in order to carry out a particular assembly operation. As discussed above, if the object 12 is randomly oriented at the pick-up location 36 and is of a sort in which a large number of orientations are possible, it may be necessary to resort to double handling of the objects 12, or exaggerated and time consuming positioning of the gripper mechanism 14, and additional degrees of freedom and/or increased sizing of parts of the manipulator device 10 may be required to pick up the object in its proper orientation with respect to the gripper mechanism 14.

According to the present invention, a reorientation device 38 is carried by each of the gripper mechanism opposing arms 30, which devices simply rotate the object 12 while in the grasp of the engagement fingers 32 through a predetemined angle of rotation so that it is reoriented with respect to the gripper mechanism 14. This predetermined angle of rotation is selected to be such that the new object 12 orientation corresponds to one of the other possible orientations which the object 12 may assume at the pick-up location 36. Typically, 180° rotation to provide an object turnover would be selected. Thus, the number of possible orientations to be accommodated is reduced by at least one. The reorientation device 38 may also provide for selective rotation through one or more predetermining angles (such as 90°) to further reduce the number of possible orientations of the object 12 to be accommodated.

This rotation is of a simple detented type so that the control system complexity is not increased, i.e., no positional control is exercised over this rotation other than the predetermined rotation which occurs upon activation of the reorientation device 38.

Referring to FIGS. 3-10 the details of the reorientation devices 38 are disclosed. This includes a housing 40 having affixed thereto an upper plate 42 which is to be mounted to the gripper mechanism 14. Affixed to the plate 42 is a cylinder member 44 having an internal bore 46 in which is disposed a piston assembly 48. The bore 46 area above the piston assembly 48 is adapted to be pressurized through inlet fitting 50 communicating therewith.

Fixed to the piston assembly 48 is an elongated rod 52 having a rack 54 machined into one side. The piston assembly 48 and elongated rod 54 are biased upwardly as viewed in FIG. 3 by means of a spring 56 surrounding the elongated rod and engaging the lower surface of the piston assembly 48.

The elongated rod 52 at its lower end passes through a bushing 58 fitted in a lower portion 60 of the housing 40 such that the rack 4 engages a first pinion gear 62 rotatably supported in the lower portion 60. First pinion gear 62 in turn meshes with a second pinion gear 64 which is pinned to a shaft 66 rotatably supported in the lower portion 60 in bearings 68 and 70.

Affixed to the shaft 66 is the turnover plate 72 which carries the pins 34 to which the gripper fingers (not shown) are detachably secured.

Turnover plate 72 engages the upper surface of a dowel 74 with a first protrusion 76 formed thereon in the angular position shown, while upon movement of the piston assembly 48 in the bore 46 downwardly to cause the rack to rotate first pinion 62, second pinion 64, shaft 66 and turnover plate 72, through 180°, a second protrusion 78 comes into engagement with the lower surface of the dowel 74 so that the turnover plate 72 is located thereby in either the 0° or 180° position.

Figure 7:
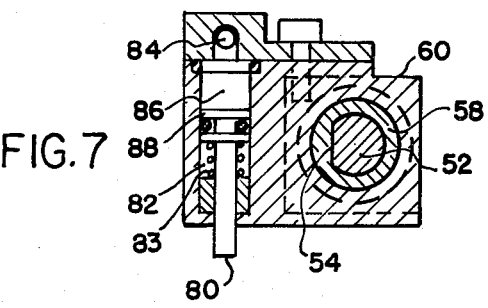
FIG. 7 is a view of the section 7—7 taken in FIG. 5.

The turnover plate 72 may selectively be arrested in its rotation so as to be located 90° or midway between its 0° and 180° positions by means of an interposer pin 80 slidably disposed in a bore 82 in lower portion 60 and adapted to be extended against the bias of spring 83 as shown in FIG. 7 upon pressurization via fitting 84, hose 85, and bore 87 of the space 86 above a piston 88 integral with the interposer pin 80. Interposer pin 80 is located so as to engage the upper surface of the first protrusion 76 as it rotates about its axis to arrest its location in the 90° position.

In order to provide electrical signals indicative of the particular position of each of the turnover plates 72, three microswitches 90, 92 and 94 are provided with each of the microswitch levers triggered by three corresponding activator pins 96, 98 and 100 slidably supported in a plate 102 fixed to the lower portion 60. Each actuator pin 96, 98 and 100 is cammed against its respective microswitch lever by engagement with a respective one of three oval point set screws 104, 106 and 108, carried by turnover plate 72, with set screw 108 engaging actuator pin 96 when the turnover plate 72 is in the 0° position, set screw 106 engaging actuator pin 100 in the 90° position, and set screw 104 egaging actuator pin 98 in the 180° position.

FIG. 11 shows the relative simplicity of the controls for the reorientation device 38, requiring only a pair of three-way valves 110 and 112 which respectively control the communication of the space above pistons 88 and 48 with a pressure source 114 and regulator 116.

It can be appreciated that such a reorientation capability is provided about an axis parallel to the surface on which the object 12 rests, when the manipulator device 10 is positioned over the pick-up location 36 as shown in FIG. 1, since an infinite number of positions of the object 12 can be accommodated merely by rotation about axis 18 so that reorientation would not be required.

It can also be appreciated that while incremental rotation of the object 12 has been provided for 90° and 180°, more such positions could be added, for example, by additional interposer pins, and angular positions could be selected other than the 90° and 180° described, although for most objects these angles would be most advantageous.

What is claimed is:

1. In combination with a manipulating device of the type having means for holding an object, means for moving said object in a first direction, means for moving said objection a second direction which is transverse to said first direction wherein movement in said second direction is independent of movement in said first direction, means for rotating the object held by the holding means, and mechanical means selectively interposed in the path of the rotating means for stopping the rotating means after a rotation through a first angle of rotation, the improvement comprising:

second mechanical means for stopping the rotating means at a second angle of rotation, wherein said second angle of rotation is less than the first angle of rotation, said second stopping means being movable between a first position and a second position, wherein in one position the second stopping means is interposed in the path of the rotating means to stop the rotating means;

means for controlling the position of the second stopping means, whereby the object may be selectably rotated through either the first angle of rotation of the second angle of rotation; and means for sensing the position of the rotating means for indicating the angle of rotation completed.

2. A manipulating device of the type described in claim 1 wherein said rotating means is a pair of turnover plates rotatably mounted to said manipulator device.

3. A manipulator device of the type described in claim 2 wherein each of said first and second mechanical stopping means are pins movably mounted to the manipulating device in the path of the turnover plates, said first stopping pin located to stop the turnover plate after rotation through a first angle and said second stopping pin located to stop the turnover plate after rotation through a second angle.

4. A manipulator device of the type described in claim 1 wherein the moving of said object in said first direction and said second direction is a moving of the object in translation.

* * * * *